United States Patent [19]

Kohl

[11] Patent Number: 4,773,918
[45] Date of Patent: Sep. 27, 1988

[54] BLACK LIQUOR GASIFICATION PROCESS

[75] Inventor: Arthur L. Kohl, Woodland Hills, Calif.

[73] Assignee: Rockwell International Corporation, El Segundo, Calif.

[21] Appl. No.: 667,937

[22] Filed: Nov. 2, 1984

[51] Int. Cl.$^4$ .............................................. C10J 3/00
[52] U.S. Cl. .................................... 48/197 R; 48/203; 48/209; 162/30.11; 423/DIG. 3
[58] Field of Search ...................... 48/197 R, 203, 209, 48/DIG.2; 423/207, DIG. 3, DIG. 12; 162/30.1, 30.11; 60/39.02

[56] References Cited

U.S. PATENT DOCUMENTS

| | | | |
|---|---|---|---|
| 1,808,773 | 6/1931 | Grondona | 423/207 |
| 2,056,266 | 10/1936 | Goodell | 422/185 |
| 2,716,598 | 8/1955 | Moses | 48/DIG. 2 |
| 3,718,446 | 2/1973 | Brink et al. | 48/209 |
| 3,916,617 | 11/1975 | McKenzie | 60/39.02 |
| 4,141,694 | 2/1979 | Camacho | 48/92 |
| 4,235,425 | 11/1980 | Beggs et al. | 48/92 |

Primary Examiner—Peter Kratz
Attorney, Agent, or Firm—H. F. Hamann; Harry B. Field; Clark E. DeLarvin

[57] ABSTRACT

A process for recovering the energy and chemical content of an aqueous black liquor utilizing a reactor containing a drying zone located above a gasification zone. The reactor contains a bed of porous solid carbonaceous material in the gasification zone. Heat losses are restricted, preferably from both zones, by the provision of a layer of insulating material about the reactor. An oxygen-containing gas is introduced into the gasification zone in an amount less than about 60% of that required for complete combustion of the black liquor such that there is produced partial combustion and gasification reactions sufficient to maintain the temperature at an upper surface of the bed in the range of from about 870° to 1200° C. and to form a hot combustible gas which rises from the gasification zone. A concentrated black liquor containing alkali metal, oxysulfur compounds is introduced into the drying zone and the water contained therein evaporated by contact with the hot gases rising from the gasification zone. In the drying zone there is produced a reduced temperature product gas and dry black liquor solids which fall onto the surface of the bed in the gasification zone. The dried black liquor solids are converted into the hot combustible gas which rises from the gasification zone and alkali metal salts which melt and permeate through the bed. The product gases are withdrawn from an upper portion of the drying zone, and a melt in which the sulfur content is about 80% in the form of alkali metal sulfide is withdrawn from a lower portion of the gasification zone.

21 Claims, 2 Drawing Sheets

BLACK LIQUOR GASIFICATION PROCESS

BACKGROUND OF THE INVENTION

1. Field of the Invention

This invention relates to the gasification of black liquor. In one of its more particular aspects this invention relates to a process in which aqueous black liquor is gasified to produce a combustible gas.

2. Prior Art

In the production of pulp and paper using the sodium-based sulfate and sulfite processes digestion of wood with aqueous alkaline solutions results in the production of a byproduct which is known as spent or black liquor, hereinafter referred to as black liquor. This byproduct is considered a waste material and must be converted into useful products in order to realize economies in the overall pulping process. In particular, it is dsired to regenerate sodium sulfide, which can be used to reconstitute active solutions for the pulp digestion step in the process. In addition, it is desirable to utilize black liquor as an energy source.

The most widely practiced method of processing black liquor makes use of the Tomlinson recovery boiler. In this process concentrated black liquor is burned in the furnace of a specially designed boiler to produce steam; a molten salt product called "smelt," which contains sodium carbonate and sodium sulfide; and noncombustible flue gas, which, after suitable cleaning, is vented to the atmosphere. The process has served the pulp and paper industry for about fifty years, yet it has serious deficiencies. The large volume of flue gas is difficult to clean and can constitute an environmental problem; all recovered energy is in the form of steam, which has limited utility; explosions can occur if the boiler tubes leak and cause water to contact the smelt; and the reduction of sulfur compounds to sulfide is incomplete.

Various processes involving alternatives or improvements to the Tomlinson boiler have been used or proposed for converting black liquor to useful products.

U.S. Pat. No. 1,808,773 discloses a process which utilizes a black liquor recovery furnace having two zones of combustion. In the first high temperature combustion zone black liquor sprayed into the furance is dehydrated and substantially completely burned. In the second zone, located between the first zone and the bottom of the furnace, an additional quantity of black liquor is sprayed into the furnace along with sodium sulfate. In this second zone water is removed from the black liquor by evaporation, and partial combustion of the black liquor results in the formation in the bottom of the furnace of a smelting bed of spongy carbon, mixed with alkali residues from black liquor and added sodium sulfate. Reducing conditions maintained in the bottom of the furnace result in the reduction of sulfate to sulfide. Although this process provides an alternative to use of the Tomlinson recovery boiler the necessity for two discrete combustion zones requires a cumbersome apparatus and the absence of any provision for heat recovery results in the loss of the heating value of the black liquor.

U.S. Pat. No. 2,056,266 describes the use of a combined smelter and boiler much like the Tomlinson boiler for recovering alkali metal values from black liquor and utilizing the heat content thereof. Dried black liquor solids are fed to a fuel bed zone where they are burned in a reducing atmosphere with the result that partially burned gases rise from the fuel bed. These partially burned gases then are completely burned by introducing a stream of air into a combustion zone above the bed. The combustion zone contains boiler tubes for the production of steam. Flue gases produced in the combustion zone are allowed to rise and an inert gas is blown down on the fuel bed to prevent entrainment of solids in the gases rising from the fuel bed and to create a distinct line of separation between zones. Fused alkaline values are drained from the bottom of the bed. Although this process provides means for recovering alkali metal values from black liquor and utilizing at least some of the heat content thereof, the process requires conversion of black liquor to black liquor solids prior to introduction into the fuel bed zone. In addition, the process has many of the disadvantages inherent in the use of the Tomlinson boiler.

U.S. Pat. No. 2,182,428 discloses a process for drying waste liquors by spraying the liquor to be evaporated upon the surface of a heat transfer medium such as oil, tar, pitch, asphalt or wax. Since the heat transfer medium is inert and no combustion or reduction reactions occur, the waste liquors are merely evaporated without recovering any useful product from the evaporated liquors.

U.S. Pat. No. 4,441,959 discloses a process for recovering heat and chemical values from spent pulping liquors which utilizes a fluidized bed reaction chamber. A concentrated spent pulping liquor is combusted with air in a fluidized bed comprising a plurality of inert solid particulate materials, at least one of which is a finer particle size than another. Following combustion, the particulate materials of finer particle size are treated in an external fluidized bed heat exchanger to recover heat and to separate the finer particles from gaseous and solid products produced in the combustion. The solid products are thereafter subjected to treatment in a molten salt reducer, which results in the production of a smelt containing sodium sulfide and other salts. The gaseous products essentially comprise a noncombustible flue gas, the heat content of which is used to produce steam. The resulting cooled flue gas, following suitable purification, can be released to the atmosphere. Although this process recovers some of the heat and chemical values from spent pulping liquors, since the solid combustion products are not reduced in the fluidized beds, a separate molten salt reducer is required, adding to the complexity of the process.

Processes are also available for producing a combustible gaseous product from the gasification of various carbonaceous feed materials.

U.S. Pat. No. 3,916,617, assigned to the same assignee as the present invention, describes the use of a molten salt to produce a low Btu gas from the gasification and partial oxidation of a carbonaceous material.

U.S. patent application Ser. No. 350,560, assigned to the same assignee as the present invention, described the gasification of dried black liquor solids in a molten salt pool. In this process, a combustible offgas is produced and a high level of reduction of the sulfur content of the black liquor solids to sulfide is realized. However, it is necessary to dry the black liquor to form the black liquor solids required as feed to the molten salt pool which increases the complexity and cost of the process.

U.S. patent application Ser. No. 486,274, assigned to the same assignee as the present invention, describes the gasification of aqueous black liquor using a molten salt pool. In this process an oxygen-containing gas is introduced beneath the surface of a molten salt pool comprising an alkalai metal carbnate and an alkali metal sulfide contained within an enclosed gasifier vessel at a rate sufficient to produce a high degree of turbulence in the molten salt pool. Black liquor in the form of a coarse spray is introduced into the rising hot gases above the pool, whereby water is evaporated from the aqueous black liquor into the hot gases to produce a reduced temperature product gas and dried black liquor solids, which fall onto the surface of the pool and are dispersed therein. The dried black liquor solids are converted in the pool into a hot combustible gas, which rises out of the pool, and alkali metal salts, which merge with the existing salts in the pool. A stream of product gas with a dry basis heating value of at least about 90 Btu/scf is withdrawn from the gasifier vessel together with a molten salt product in which the sulfur content is at least about 90% in the form of alkali metal sulfide. Although the process of this invention produces the desired results of providing a combustible gas and a molten salt product in which alkali metal sulfide predominates, the process is subject to the problems of corrosion and destruction of containment materials inherent in the use of turbulent pools of molten salts. Another problem encountered in the use of a turbulent pool of molten salt is entrainment of molten salts in the gases rising out of the pool, which problem can be minimized only at the expense of limiting the gas velocity through the pool.

It is accordingly an object of the present invention to provide a process for the gasification of aqueous black liquor which has none of the disadvantages of the prior art.

Another object of this invention is to provide a process which is capable of conveniently recovering a major portion of the energy and chemical content of black liquor.

A more particular object of this invention is to provide such a process in which a combustible gaseous product is produced and in which the sulfur content of the resulting salt product is predominantly present in the form of sulfide.

Another object of this invention is to provide a process which does not require the use of a turbulent pool of molten salt.

Another object of this invention is to provide such a process in which the combustible gas has a higher heating value of at least about 90 Btu/scf.

Other objects and advantages of this invention will be apparent from the following detailed description.

SUMMARY OF THE INVENTION

In general, the present invention provides a process for the gasification of aqueous black liquor in which there is produced a combustible gas and the sulfur content of the black liquid is substantially completely converted to sulfide. The process comprises providing a reactor containing drying and gasification zones, the gasification zone being located below the drying zone. Heat losses are restricted by providing a layer of insulation material at least about a lower portion of the reactor. The drying and gasification zones are maintained at pressures in the range of about 1 to 50 atmospheres and a bed of porous solid carbonaceous material is maintained in the bottom of the gasification zone. An oxygen-containing gas is introduced into the gasification zone in an amount less than about 60% of that required for complete combustion of the black liquor to produce combustion and gasification reactions sufficient to maintain the temperature at the upper surface of the bed in the gasification zone at a value in the range of about 870° to 1200° C. (1600° to 2200° F.). A concentrated black liquor containing at least 45% solids and having a higher heating value (HHV) of at least about 3200 Btu/lb is introduced into the drying zone to evaporate water from the aqueous black liquor by contacting it with a hot combustible gas rising from the gasification zone to produce a reduced temperature product gas and dried black liquor solids, which fall into the gasification zone and onto the surface of the bed. The dried black liquor solids are converted into hot, combustible gas, which rises from the gasification zone, and alkali metal salts, which melt and permeate downward through the bed. A stream of product gas with a dry basis higher heating value of at least about 90 Btu/scf is withdrawn from the drying zone, and a melt in which the sulfur content is at least about 80% in the form of alkali metal sulfide is withdrawn from the gasification zone.

DESCRIPTION OF THE PREFERRED EMBODIMENTS

Figure 1:
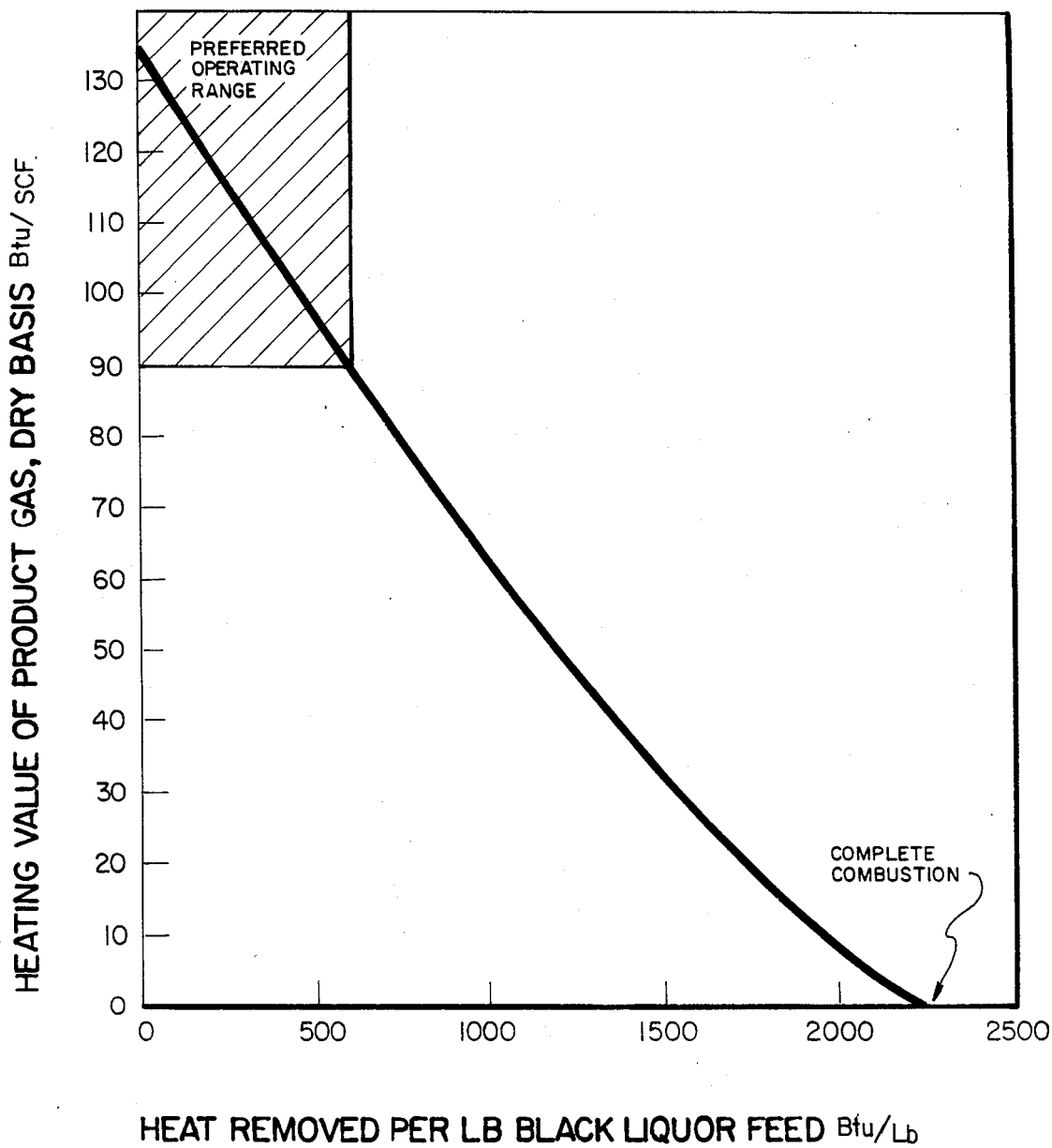
FIG. 1 is a curve showing the heating value of a gas produced in the process of the present invention as a function of the heat removed from the reactor.

Black liquor obtained from a wood-pulping operation as part of a papermaking process contains combustible organic material, alkali metal sulfide and hydroxide as well as various alkali metal oxysulfur compounds. Typically, the compounds will be the sulfate, thiosulfate, and sulfite of sodium. The economics of the papermaking process require that substantially all of the combustible material be removed and the alkali metal values be recovered from the black liquor and the oxysulfur compounds converted to alkali metal sulfide for return to the process without oxidation of the initial alkali metal sulfide.

In the process of the present invention, concentrated black liquor is dried by contact with a rising stream of combustible gas in a drying zone, then gasified by reaction with air or other oxygen-containing gas under partial oxidation conditions in a high temperature gasification zone. Inorganic salts in the black liquor are melted and the sulfur compounds therein are reduced to sulfide by contact with a porous bed of solid carbonaceous material (called the char bed) at the bottom of the gasification zone. The process of the present invention is particularly useful for gasifying and converting various black liquor feeds into useful products. It is preferred that the black liquor be concentrated to a solids content of about 45 to 75% and that the higher heating balue (HHV) of the black liquor be at least about 3200 Btu per pound. The higher heating value is normally determined by bomb calorimetry and represent the heat given off when all elements of the black liquor are oxidized fully, i.e., carbon to carbon dioxide, hydrogen to water (liquid), and sulfur to sulfate.

Heat losses from the gasification zone are minimized to permit attainment of a temperature high enough to melt the inorfanic salts and promote the gasification and salt reduction reactions, by partial combustion of the carbaonaceous material in the black liquor feed, without the requirement for complete combustion as in the prior art. Specifically, less than about 60% of the quantity of oxygen required to complete combustion is introduced into the gasification zone to produce a temperature in the range of about 870° to 1200° C. (1600° to 2200° F.) where the complete combustion is defined as the conversion of all carbon and hydrogen in the carbonaceous material to $CO_2$ and $H_2O$ without oxidation of sulfur. The partial combustion and gasification reactions result in the production of a high temperature combustible gas containing substantial amounts of CO and $H_2$ which flows upward from the gasification zone to the drying zone where it heats and causes water to be evaporated from the black liquor feed. The substantial energy requirement for water evaporation is provided primarily by the sensible heat of the combustible gas, rather than by further combustion. The combustible gas is therefore cooled as it passes through the drying zone.

Sufficient oxygen must be added in the gasification zone to assure conversion of substantially all of the carbonaceous material in the black liquor to gaseous species such as CO, $CO_2$, $H_2$, $H_2O$, and $CH_4$. A minor amount of the carbon in the black liquor may leave the system with the molten salt as suspended particles of elemental carbon or as sodium carbonate. Typically, at least 30% of the quantity of oxygen required for complete combustion is required to assure complete gasification.

Conservation of energy in the gasification zone is a critical requirement for the production of a suitable combustible gas, i.e., a gas with a dry basis heating value of at least 90 Btu/scf. Excessive heat loss or heat removal requires more complete combustion to release the required energy which, in turn, requires a higher air/black liquor feed ratio and results in a lower heating value gas. In the Tomlinson boiler, for example, where heat is intentionally removed to generate steam, a noncombustible flue gas is produced. The direct effect of heat loss or heat removal on product gas heating value is illustrated by FIG. 1 for typical operating conditions.

Sufficient heat must be generated by the partial combustion reactions in the gasification zone to (1) raise the temperature of the air feed and the dried black liquor particles entering the gasification zone to the temperature of the gas and molten salt streams leaving the zone, (2) evaporate any remaining water in the dried black liquor particles, (3) melt the inorganic salts, (4) provide energy for endothermic sulfur reduction and gasification reactions, and (5) make up for heat losses by conduction through the walls and floor of the gasification zone and by radiation upward to the drying zone.

As pointed out above, it is critical that the heat generation requirement be minimized. This is accomplished by various features of the invention including preheating the feed air to a temperature of at least 300° F. and preferably at least 500° F.; drying and heating the black liquor feed prior to its entry into the gasification zone by extracting sensible heat from the product gas rather than by generating heat by further combustion of carbonaceous materials; and restricting heat losses from the gasification zone by conduction and radiation to less than about 15% of the heating value of the black liquor feed. The restriction of heat losses can be accomplished by an appropriate combination of configurational considerations and thermal insulation. In general, heat losses per unit of feed are less for large systems because the capacity increases more rapidly than the external surface area and for elevated pressure systems because the capacity of a given size unit is increased by increased pressure. Individual gasifier unit capacities greater than about 100 tons black liquor feed per day and operating pressures greater than about 4 atmospheres are preferred.

Figure 2:
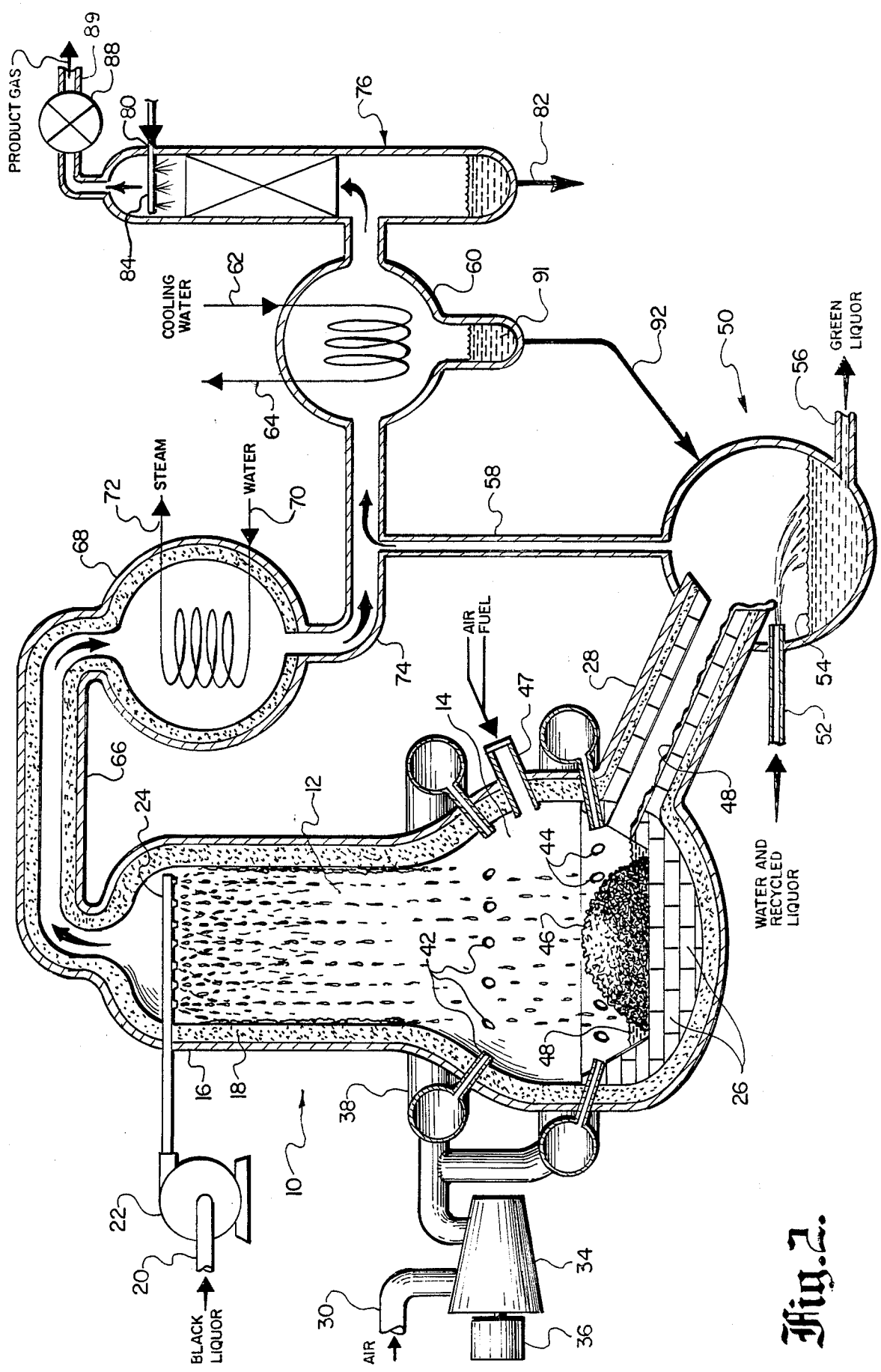
FIG. 2 is a diagrammatic view, partly in cross-section of one embodiment of a reactor and associated equipment which can be used in carrying out the process of the present invention.

A typical reactor and the associated equipment utilizable for the practice of the present invention will now be described with reference to FIG. 2 of the drawings. A reactor 10 contains a drying zone 12 located above a gasification zone 14. Reactor 10 has an outer wall 16 provided with a lining of an insulating material 18 capable of withstanding the temperatures and environment within reactor 10. Insulating material 18 is provided in sufficient thickness to minimize, to the extent practical, heat losses from within reactor 10. The black liquor to be treated is introduced (from a source not shown) through a conduit 20 to a pump 22. From pump 22, the black liquor is introduced into reactor 10 via a spray system 24 which injects the black liquor as a coarse spray into an upper poriton of drying zone 12.

There also is provided a gas supply system which includes an inlet conduit 30 for an oxygen-containing gas (typically air) which leads into a compressor 34 driven by a motor 36. When reactor 10 is operated at substantially ambient pressure, compressor 34 may be a fan. However, in accordance with the preferred embodiment wherein reactor 10 is operated at an elevated pressure, compression is required. An advantage obtained by compressing the oxygen-containing gas is that it also increases the temperature of the gas. The pressurized oxygen-containing gas from compressor 34 is introduced into gasification zone 14 of reactor 10 via a manifold 38 through a circumferential array of gas injection ports 42 and 44. Gas injection ports 42 and 44 are arranged to direct oxygen-containing gas toward a bed of carbonaceous material, (char bed 46) reducing agent located on a liner of refractory blocks 26 lining a bottom portion of reactor 10.

Advantageously, reactor 10 is further provided with a burner assembly 47 for providing a stream of hot gas into reactor 10 to preheat it prior to starting operation and optionally for providing an additional source of heat during operation. During normal operation, there also is produced in and around char bed 46, a pool of melt 48 which is discharged through melt outlet 28 into an enclosed quench tank 50. Water is introduced into quench tank 50 via a conduit 52. The water quenches melt 48 forming a pool of green liquor 54 containing reduced chemical salts from the black liquor. The green liquor is withdrawn via a conduit 56 typically for return to a pulping process. A portion of the green liquor product may be recycled to conduit 52 to aid in breaking up melt 48. During the quenching of melt 48, there is produced a hot product gas principally comprising water vapor which is withdrawn from quench tank 50 via conduit 58.

Referring back to reactor 10, adjacent an upper portion of drying zone 12, there is provided a gas outlet conduit 66 for the removal of hot product gases from reactor 10. Conduit 66 provides for the transfer of hot gases from reactor 10 to a heat recovery device such as a steam generator 68 which typically will be provided with a water inlet 70 and a steam outlet 72. It will be noted that conduit 66 and steam generator 68 also are provided with a layer of insulating material 18 to reduce thermal losses from the system.

Steam generator 68 is provided with a gas outlet 74 which is in fluid communication with conduit 58 for combining the gas streams from steam generator 68 and quench tank 50, respectively. The combined gas streams enter a heat exchange device, such as a condenser 60, where they are cooled for the removal of a substantial amount of the water vapor therefrom. As depicted, the gases are cooled by passing them in indirect contact with a cooling fluid passing through a coil provided with a cooling fluid inlet 62 and cooling fluid outlet 64. The water vapor condensed from the combined gases is collected in a lower portion 91 of condenser 60 and preferably returned to quench tank 50 via a conduit 92.

Generally, the gases exiting condenser 60 are passed through an acid gas absorbing device typically an absorber tower 76. An absorbent for the acid gas is introduced into absorber 76 via conduit 80 and a distribution device such as spray nozzle 84 such that the gases passing through absorber 76 are contacted with a countercurrent flow of absorbent. The particular acid gas absorbent utilized is not critical although an aqueous solution of methyldiethanolomine is preferred for its high efficiency in acid gas removal and its selectivity towards the more noxious acid gases such as $H_2S$ and the like. A process stream such as dilute black liquor or green liquor may be used for acid gas absorption. The acid gas absorbent containing the acid gas constiuents removed from the gas is withdrawn via conduit 82. The effluent gas from absorber 76 is withdrawn via valve 88 and conduit 80, substantially purified of any noxious acid gas constitutents and suitable for use as fuel for a gas turbine or other purposes.

Inasmuch as the operation of steam generators, condensers, and absorbers are state-of-the-art, the following discussion will be directed principally toward the operation of reactor 10 which forms one of the more key aspects of the present invention.

It is desirable to operate gasification zone 14 at a relatively constant temperature; 100° C. for example in the gas space above the char bed 46. This can be accomplished by adjusting the air/black liquor ratio up or down to raise or lower the temperature as required to maintain the desired value. If other parameters such as black liquor composition, air preheat, and heat losses are constant, this mode of operation will result in the production of a product gas of relatively constant composition and heating value. The product gas heating value can be increased, if desired, by introducing a high heating value fuel such as oil or petroleum coke into the gasification zone; increasing the temperature of the air feed, or reducing heat losses, by adding insulation, for example. Gaseous fuel such as natural gas or volatile hydrocarbons can, of course, be added directly to the product gas to raise its heating value.

In the gasification zone, preheated air is introduced through ports 42 and 44 situated around and above the char bed. A portion of the oxygen in the air reacts with combustible components of the gas phase and falling particles of dried black liquor to produce a high temperature zone immediately above the char bed but below the drying zone. Unreacted oxygen in the air which impinges upon the surface of char bed 46 reacts directly with the solid carbon in the bed by the reaction

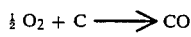

$$\tfrac{1}{2} O_2 + C \longrightarrow CO$$

-continued $$O_2 + C \longrightarrow CO_2$$

Bed 46 is porous, allowing oxygen to diffuse into it for several inches forming an active layer in which gasification, melting, and sulfur compound reduction occur. Melt 48 percolates downward through the char bed undergoing further reduction by reaction with carbon and flows out through the edge of the bed to a drain port. During steady state operation, the height of the char bed is relatively constant. Carbon which is consumed by reaction with oxygen or oxysulfur compounds is continuously replaced by the carbon remaining in particles which fall onto the upper surface of the bed. The bed height may be modified by changing the relative amounts of air feed through the various air feed ports, the air and/or black liquor feed rates, or other operating parameters.

Molten salt which forms melt 48 collects at the base of the char bed and flows out of the gasification zone to quench tank 50 where it is dissolved in water to form green liquor. It is advantageous to operate the quench tank at the same pressure as the gasifier to avoid the requirement for a pressure control valve operating on molten salt. The green liquor, which contains dissolved sodium sulfide, may be recycled to the pulping process or used for other purposes.

Gas rising from drying zone 12 contains CO, $H_2$, $H_2O$, $CO_2$, $CH_4$ and, if air is used, $N_2$ plus various trace components and impurities and is at a temperature in the range of about 870° to 1200° C. (1600° to 2200° F.). Two impurities of special interest are $H_2S$, derived from sulfur in the black liquor feed, and fine particles of sodium salts, such as sodium carbonate and sodium sulfide, produced by vaporization and reaction phenomena. As the gas passes through drying zone 12, it is cooled to a temperature in the range of about 350° to 850° C. depending upon the entering temperature, the water content of the black liquor and other factors. Preferably it is cooled to a temperature at which the particles of sodium salts are solid, which is below about 790° for typical salt compositions.

As pointed out above, an oxygen-containing gas is introduced into gasification zone 14 of reactor 10 in order to cause the partial oxidation of the black liquor, generate the required high temperature, and produce the desired products. The oxygen-containing gas may suitably be air or, if desired, oxygen enriched air or pure oxygen can be used. Although pure oxygen may be utilized in the process of this invention, it is less desirable than air or oxygen-enriched air because of the higher cost of oxygen and the requirement of an oxygen plant being located near the gasification reactor. In general, the velocity of gas in the vertical direction as it leaves the gasification zone should not exceed about 20 ft/sec and preferably should be in the range of 2 to 15 ft/sec.

The pressure within reactor 10 should be within the range of about 1 to 50 atmospheres with superatmospheric pressure particularly desired. Preferably a pressure of about 4 to 20 atmospheres should be used. The use of superatmospheric pressure is desirable for a number of reasons. Safety of the process is enhanced by the use of superatmospheric pressure because explosions which may occur when mixing melt and water in the process of quenching the melt are inhibited by increased pressure. The product gas volume and consequently the size of the equipment necessary for conducting the process is reduced by a factor of as much as about 20:1 when superatmospheric pressure are used. This reduces both cost and heat losses. In addition, salt vaporization is reduced eliminating the necessity for extensive cleanup of the gas produced in the process. The removal of vapor-phase impurities such as hydrogen sulfide from the product gas by absorption or adsorption processes is facilitated by increased pressure. Another advantage of operating the process under pressure is increased thermal efficiency of the process due to partial recovery of melt thermal energy which is made possible by the increase in boiling point of the quench tank solution as the pressure is increased. Another advantage is that the product gas is available at the pressure required for use in subsequent operations such as at the inlet to a gas tubine.

Temperatures in gasification zone 14 near the upper surface of char bed 46 are maintained in the range of about 870° to 1200° C. (1600° to 2200° F.) and preferably in the range of about 900° to 1070° C. (1650° to 1950° F.). It should be noted that the gasification zone does not operate at a completely uniform temperature. The highest temperature is normally at the surface of the char bed where injected oxygen reacts with exposed carbon. Temperatures within the char bed can be significantly lower due to the endothermic sulfur reduction reactions occurring and temperatures near the top of the gasification zone decrease as the gas approaches the drying zone. The high temperature gases rising from the gasification zone are cooled to a temperature of about 350° to 850° C. during passage through the drying zone. The cooling effect represents an additional benefit of this invention in that it causes droplets of molten salt which might be entrained in the rising gas to be solidified before leaving the reactor. The resulting solid particles do not adhere to or corrode heat transfer surfaces and other equipment in the product gas processing system.

It is very important that heat be retained within the gasification zone because heat losses from this zone result in the requirement for a higher air-to-black-liquor feed ratio to maintain temperature and result in the production of a gas with a lower heating value. It is somewhat less important that heat losses be minimized from the drying zone because heat losses from this zone act primarily to reduce the temperature but not the heating value of the product gas. Heat losses from both zones are reduced by the use of insulating material 18. Any convenient insulation can be used for this purpose. For example, insulating blankets, castable refractory, fire brick, fiberglass or tile can be used for this purpose. Materials which are in contact with high temperature molten salt and salt vapors must be resistant to attach by these agents. High purity fusion cast alumina blocks for example have been found to be quite resistant.

The necessity for keeping the heat losses to a minimum can be appreciated by reference to FIG. 1 which shows the dependence of the heating value of the product gas upon the heat removed from the gasification zone by conduction or radiation. The curve is based upon a black liquor feed having a higher heating value of 4119 Btu/lb and a temperature of 220° F. It is also based upon an air feed temperature of 700° F., a gasification zone average temperature of 1832° F., and essentially 100% conversion of sulfur compounds to the sulfide form. As can be seen from the curve where it is desired to have a higher heating value of product gas of at least about 90 Btu/standard cubic foot (scf), the heat removed must be kept to a relatively low fraction of the heating value of the black liquor. In general, the heat removed, which is equivalent to heat losses from the gasification zone, should be no more than about 15% of the higher heating value of the black liquor and it is preferred that the heat losses be no more than 10% of the black liquor heating value. In FIG. 1, a heat removal of about 600 Btu/lb is at the outside of the preferred operating range and represents about 15% of the higher heating value of the black liquor of 4119 Btu/lb.

The control of heat losses is an important feature of the present invention and is in sharp contrast to the practices utilizing the Tomlinson boiler or an equivalent thereof in which the heat produced in the combustion of black liquor is used to convert water to steam in boiler tubes present in the reactor. Rather than removing heat in this manner, in order to produce a combustible gas product having the desired higher heating value, it has been found essential to prevent the heat from being lost. In particular, where it is desired to have the higher heating value of the product gas be at least about 90 Btu/scf, it is necessary to design the system so that no more than about 15% of the higher heating value of the black liquor be lost as pointed out above. In order to limit heat loss from the gasification zone by radiation upward into the cooler drying zone it is necessary that the cross sectional area of the reactor at the bottom of the drying zone be limited. For example, a cross sectional area less than about 0.011 ft$^2$ per lb/hr of black liquor feed will limit radiation losses to less than about 600 Btu per lb of black liquor for typical operating conditions. Since some heat losses by conduction through the walls can also be expected and a total heat loss appreciably less than 600 Btu per lb of black liquor feed is desirable, a cross sectional area less than about 0.008 ft$^2$ per lb/hr of black liquor feed is preferred. Thus a commercial unit to handle 100 tons per day of black liquor feed (8333 lb/hr) would require a reactor cross sectional area smaller than 66.7 ft$^2$, or a maximum inside diameter of about 9 ft at the bottom of the drying zone.

The heat loss or heat removal shown in FIG. 1 and referred to in the above discussion refers only to heat which leaves the gasification zone by radiation or conduction into or through the walls and which is therefore controllable by proper system design. In addition, it is important that the black liquor be completely dried before it enters the gasification zone so that heat will not be consumed evaporating water, and that the air be preheated to minimize the heat required to raise its temperature. Certain heat losses are unavoidable however and set an upper limit of about 75% on the heating value of the black liquor that can be converted to product gas heating value. The unavoidable heat losses include sensible heat in the product gas and product melt and the heating value of sulfide in the melt.

In order to achieve the desired gasification of aqueous black liquor in the process of the present invention, aqueous black liquor is introduced into drying zone 12 of reactor 10 in a manner than provides an adequate area of black liquor surface in direct contact with the rising stream of hot gas. The black liquor may be sprayed into the reactor to form falling drops which are dried by the gases rising from the gasification zone, with the water being vaporized from the black liquor before the black liquor reaches the surface of the char bed. Thus, essentially dry black liquor solid particles fall onto the surface of the bed. Spray particles may also strike the inner walls of the vessel in the drying zone where they adhere and are dried to form deposits of carbonaceous material and salts which subsequently fall from the walls onto the surface of the char bed and undergo the desired gasification and reduction reactions. However, it is not desirable to introduce the black liquor in so fine a spray that the dried, finely divided black liquor solids are entrained in the hot gases rising through the gasifier. The coarseness of the spray is adjusted so that adequate drying with minimum entrainment occurs.

The gas produced as a result of the gasification of the black liquor solids has a dry basis higher heating value of at least about 90 Btu/scf primarily due to the presence of CO, $H_2$ and $CH_4$. As the gas rises through the black liquor drying zone, its water vapor content increases and its temperature decreases as a result of evaporation of water from the black liquor. In addition, the increase in water vapor causes the water gas shift reaction to occur as follows: $CO + H_2O = CO_2 + H_2$. This results in a change in gas composition so that the gas leaving the top of the drying zone contains less CO and more $H_2$ than that leaving the gasification zone. However, the higher heating value is not materially changed by the reaction.

Gas leaving the drying zone may be processed in a number of ways. Preferably, its sensible heat is utilized for the production of steam or other heating service in steam generator 68. For most applications, it is desirable to remove water vapor, fine salt particles, and $H_2S$ from the gas before it is used. These steps may be accomplished in conventional equipment such as condenser 60 to remove water vapor, absorption columns employing alkaline solutions to absorb $H_2S$, and fume scrubbers or fabric filters to remove particulate matter. The water, salt, and sulfur recovered in such steps can normally be recycled to the pulp mill or gasification process. In some caes it may be desirable to purify the product gas as it leaves the gasifier without further cooling so that the sensible heat and compression energy in the gas and in the water vapor may be utilized in a gas turbine or other energy conversion system.

As pointed out, melt flows out of gasification zone 14 into quench tank 50 where it is dissolved in water at gasifier pressure. The melt will solidify and block the flow path if it is permited to cool below about 760° C. (1400° F.) while in contact with the discharge nozzle. It is therefore desirable to allow a portion of the high temperature gas from the gasification zone to flow through the melt discharge line to help maintain a high temperature in this line. This gas will flow into quench tank 50 from which it can be vented to the product gas system at a point downstream of the gasifier. Other means may be used to maintain a clear path for melt flow including auxiliary burners and mechanical breaker systems.

EXAMPLE

To demonstrate the utility of the present invention, a quantity of a black liquor from a commercial papermaking operation was obtained. An analysis of the black liquor is set forth in Table 1. A series of three tests were run by introducing the black liquor into an upper end of a 6-in.-diameter bench-scale reactor. Prior to the start of the test, an initial carbon bed was provided on a layer of chromium oxide block located in a lower portion of the reactor. Three air distribution tubes were arranged in the reactor to direct air streams downward onto the carbon bed. To simulate the restriction of heat losses which are obtained as taught in accordance with the present invention, the reactor was placed in a furnace which was maintained at an elevated temperature such that less than about 15% of the heating value of the black liquor would be lost. The test conditions and results are set forth in Table 2.

TABLE 1
BLACK LIQUOR CHARACTERISTICS

| | Weight % |
|---|---|
| Overall Composition | |
| Water | 35.3 |
| Solids | 64.7 |
| | 100.0 |
| Elemental Analysis (Dry Basis) | |
| Carbon | 35.1 |
| Hydrogen | 4.2 |
| Sodium | 19.0 |
| Sulfur | 4.5 |
| Oxygen | 37.0 |
| Trace Elements | 0.2 |
| | 100.0 |
| Heating Value | Btu/lb |
| HHV, wet basis | 4119 |
| HHV, dry basis | 6367 |

TABLE 2
TEST RESULTS

| | | | |
|---|---|---|---|
| Air/Black Liquor Stoichiometric Ratio* | 0.36 | 0.48 | 0.50 |
| Temperature, °C. | | | |
| Gasification Zone | 1030 | 1080 | 1130 |
| Drying Zone | 740 | 800 | 825 |
| Product Gas Composition Vol. % Dry Basis | | | |
| $CO_2$ | 11.1 | 12.7 | 13.6 |
| $C_2H_4$ | 0.33 | 0.27 | 0.27 |
| $H_2S$ | 0.45 | 0.36 | 0.51 |
| $H_2$ | 11.2 | 11.6 | 9.2 |
| Ar | 0.57 | 0.62 | 0.70 |
| $N_2$ | 49.7 | 52.5 | 58.1 |
| $CH_4$ | 2.41 | 1.61 | 1.89 |
| CO | 19.8 | 16.4 | 14.1 |
| $C_2H_6$ | 0.15 | 0.06 | 0.14 |
| Product Gas HHV, Btu/scf Dry Basis | 138 | 117 | 103 |

*Ratio of air feed rate to amount required for complete combustion. A value of 1.0 represents an air feed rate of approximately 2.63 lb air per lb black liquor for the black liquor tested.

From Table 2 it is seen that in each instance a product gas was produced having a higher heating value substantially in excess of 90 Btu/scf. Further, following the test, a sample of the melt was obtained and it was determined that in excess of 90% of the alkali metal sulfur compounds present were in the form of alkali metal sulfide. Thus, this example clearly demonstrates the advantages and efficacy of the present invention.

To those skilled in the art, it will be obvious upon a study of this disclosure that the invention is amenable to various modifications, and it may be given embodiments other than those particularly illustrated and described herein without departing from the essential features of the invention or the scope of the appended claims.

What is claimed is:

1. A process for recovering the energy and chemical content of aqueous black liquor comprising:
   (a) providing a reactor containing drying and gasification zones, the gasification zone being located below the drying zone;

(b) maintaining said zones at pressures in the range of fromabout 1 to 50 atmospheres;

(c) forming a bed of porous solid carbonaceous material in the bottom of said gasification zone;

(d) restricting heat losses from said gasification zone by providing a layer of insulation material about a lower portion of said reactor;

(e) introducing into said gasification zone an oxygen-containing gas to produce partial combustion and gasification reactions sufficient to maintain the temperature at the upper surface of said bed at a value in the range of from about 870° to 1200° C. (1600° to 2200° F.), and form a hot combustible gas which rises from said gasification zone, the total amount of oxygen-containing gas introduced into said reactor being less than about 60% of that required for complete combustion of the black liquor;

(f) introducing into said drying zone a concentrated aqueous black liquor containing alkali metal oxysulfur compounds, said black liquor comprising at least 45 wt % solids and having a higher heating value of at least about 3200 Btu/lb;

(g) evaporating water from said aqueous black liquor by contacting it with the hot gases rising from said gasification zone to produce a reduced temperature product gas and dried black liquor solids, which fall onto the surface of said bed;

(h) converting said dried black liquor solids in said gasification zone into the hot, combustible gas, which rises from said zone and alkali metal salts, which melt and permeate downward through said bed;

(i) withdrawing from an upper portion of said drying zone a stream of product gas with a dry basis higher heating value of at least about 90 But/scf; and (j) withdrawing from said gasification zone a melt in which the sulfur content is at least about 80% in the form of alkali metal sulfide.

2. In the process of claim 1 wherein in Step (e) said temperature is maintained at about 1000° C.

3. In the process of claim 1 wherein in step (g) said reduced temperature is in the range of about 350° to 850° C.

4. The process of claim 1 wherein in Step (b) said pressure is in the range of about 4 to 20 atmospheres.

5. The process of claim 1 wherein in Step (e) said temperature is in the range of about 900° to 1070° C.

6. The process of claim 1 wherein in Step (d) said heat losses are restricted to less than about 15% of the higher heating value of the black liquor.

7. The process of claim 1 wherein a portion of the hot combustible gases produced in Step (e) are withdrawn along with the melt in Step (j).

8. The process of claim 1 wherein the stream of product gas withdrawn from Step (i) is passed in indirect heat exchange relationship with water for the production of steam.

9. The process of claim 1 wherein the hot product gas withdrawn from Step (i) is cooled to condense water contained therein and the water is recovered and used as at least a part of the quench medium for quenching melt withdrawn in Step (j).

10. The process of claim 1 wherein the product gas withdrawn in Step (i) is treated for the removal of $H_2S$ contained therein.

11. The process of claim 4 wherein said product gas is used as a source of fuel for a gas turbine.

12. The process of claim 1 wherein said alkali metal is sodium.

13. A process for recovering the energy and chemical content of an aqueous black liquor comprising:

(a) providing a reactor containing drying and gasification zones, the gasification zone being located below the drying zone;

(b) maintaining said zones at a pressure in the range of from about 1 to 50 atmospheres;

(c) forming a bed of porous solid carbonaceous material in the bottom of said gasification zone;

(d) restricting heat losses from said gasification zone by providing a layer of insulation material about said reactor;

(e) introducing into said gasification zone an oxygen-containing gas to produce partial combustion and gasification reactions sufficient to maintain the temperature at the upper surface of said bed at a value in the range of from about 870° to 1200° C. (1600° to 2200° F.), and form a hot combustible gas which rises from said gasification zone, the total amount of oxygen-containing gas introduced into said reactor being less than about 60% of that required for complete combustion of the black liquor;

(f) introducing into said drying zone a concentrated aqueous black liquor containing alkali metal oxysulfur compounds, said black liquor comprising at least 45 wt % solids and having a higher heating value of at least about 3200 Btu/lb;

(g) evaporating water from said aqueous black liquor by contacting it with the hot gases rising from said gasification zone to produce a moisture-containing product gas having a temperature in the range of about 350° to 850° C. and dried black liquor solids which fall onto the surface of said bed;

(h) converting said dried black liquor solids in said gasification zone into the hot, combustible gas which rises from said zone and alkali metal salts which melt and permeate downward through said bed;

(i) withdrawing from an upper portion of said drying zone a stream of product gas with a dry basis higher heating value of at least about 90 Btu/scf;

(j) withdrawing from said gasification zone a melt in which the sulfur content is at least about 80% in the form of alkali metal sulfide;

(k) introducing said melt into a quench vessel and quenching said melt with an aqueous solution to form a green liquor and a moist product gas;

(l) combining the product gases from Steps (i) and (k) and cooling the combined gases to condense water therefrom; and (m) using the condensed water from Step (l) as at least part of the quench solution for Step (k).

14. The process of claim 13 wherein in Step (b) said pressure is in the range of about 4 to 20 atmospheres.

15. The process of claim 13 wherein in Step (e) said temperature is in the range of about 900° to 1070° C.

16. The process of claim 13 wherein in Step (d) all of the surfaces of said reactor are provided with a layer of insulation material and said heat losses are restricted to less than about 15% of the higher heating value of the black liquor.

17. The process of claim 13 wherein a portion of the hot combustible gases produced in Step (e) are withdrawn along with the melt in Step (j).

18. The process of claim 13 wherein the stream of product gas withdrawn from Step (i) is passed in indirect heat exchange relationship with water for the production of steam prior to Step (l).

19. The process of claim 13 wherein the combined product gases from Step (l) are treated for the removal of $H_2S$ contained therein.

20. The process of claim 14 wherein said treated gas is used as a source of fuel for a gas turbine.

21. The process of claim 13 wherein said alkali metal is sodium.

* * * * *